United States Patent Office 2,871,224
Patented Jan. 27, 1959

2,871,224

AROMATIC AMINE ALDEHYDE PERCHLORATE RESINS

Richard D. Cadle, Palo Alto, Calif., and Ross W. Moshier, Miamisburg, Ohio

No Drawing. Application December 22, 1949
Serial No. 134,593

2 Claims. (Cl. 260—72.5)

(Granted under Title 35, U. S. Code (1952), sec. 266)

This invention relates to new and useful propellant compositions.

The object of this invention is the preparation of new compounds having superior properties for use as propellants. The invention is effected by forming a resin which is the reaction product of an aromatic amine, an aldehyde, and perchloric acid. The resins are prepared by forming perchlorate salts from aromatic amine-aldehyde resins. Preferably the aldehyde and aromatic amine combination is polymerized in the presence of perchloric acid which serves the double function of catalyzing the polymerization and of entering into the combination to form the desired perchlorate salt.

In general the instant invention is practiced by adding an aldehyde to an aromatic amine dissolved in perchloric acid. After evaporation of the solvent, the resulting resin was found to burn with almost explosive violence.

Specific examples of ways in which the instant invention has been practiced are:

Example I

Aniline (0.47 gram) was dissolved in 0.92 gram of 70% $HClO_4$. Water was added until the total volume was 5 milliliters. Then 0.62 gram of 37% formaldehyde was added, the mixture stirred, and the water was removed by evaporation at about 95° C. A hard, yellow resinous condensation product was obtained which burned with almost explosive violence. The resin was insoluble in water, alcohol, or ether.

Example II

M-phenylenediamine (0.11 gram) was added to 1 ml. of water. 70% perchloric acid (0.35 gram) was added. The mixture was stirred to dissolve the amine and 0.24 gram of 37% formaldehyde was added. A heavy precipitate formed. The mixture was dried at 80° C. The product was a brittle black resin which burned extremely rapidly and exploded on hard impact or when heated to 215° C.

Example III

Benzidine (0.47 gram) was added to 4 ml. of water and 0.92 gram of 70% perchloric acid was stirred in. When the benzidine had dissolved, 0.62 gram of 37% formaldehyde was added. A gel formed immediately. When dried at 80° C., the gel became a hard, fast burning, water-insoluble resin.

Example IV

Aniline (0.93 gram) was added to 10 ml. of water, which included 1.44 grams of 70% perchloric acid and 0.24 gram of acetaldehyde, the whole being dissolved together. The solution was evaporated to dryness by leaving it in an oven at 85° C. for three days. The product was a fast-burning resinous mass.

Example V 30.9 parts of m-phenylenediamine were added to 22 parts of 32% hydrochloric acid and 15 parts of water. The solution was cooled to 0° C., and 30 parts of crushed ice were added. Formalin (59 parts) was added and the mixture was stirred vigorously for one minute. The resulting resin was soaked first in concentrated ammonium hydroxide and then in perchloric acid to obtain the perchlorate-containing resin.

Aromatic amines and aldehydes other than those mentioned in the examples can be used as long as the product contains an appreciable amount (more than 5%) of perchlorate groups.

Propellants containing the above-described resins have been created in the following manner. A mixture consisting of equal parts of liquid "Thiokol," ground potassium perchlorate, and ground m-phenylenediamine-formaldehyde-perchloric acid resin was cured by heating for three days at 75° C. The "Thiokol" contained 6.7% of p-quinonedioxime (catalyst) and 3.3% of diphenylguanidine (stabilizer). The product was a hard solid which burned at the rate of about 100 centimeters per second at 1000 pounds per square inch absolute.

A rapid-burning propellant composition was also created by combining 40% ground potassium perchlorate, 20% "Buramine" resin, and 40% of the amine-aldehyde-perchlorate resin according to the instant invention. The mixture was pressed under 30,000 pounds per square inch pressure and cured overnight at 100° C. The product was a hard, strong, propellant solid.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

What is claimed is:

1. Propellant compositions comprising the condensation product of aniline and formaldehyde with perchloric acid, in which the perchlorate groups are present to the extent of more than 5%.

2. Propellant compositions comprising the condensation product of a member of the group consisting of aniline, M-phenylenediamine, and benzidine and formaldehyde with perchloric acid, in which the perchlorate groups are present to the extent of more than 5%.

References Cited in the file of this patent

UNITED STATES PATENTS

| | | |
|---|---|---|
| 1,964,222 | Scott | June 26, 1934 |
| 2,334,149 | Ripper | Nov. 9, 1943 |
| 2,406,572 | Vogl | Aug. 27, 1946 |
| 2,416,639 | Pearsall | Feb. 25, 1947 |
| 2,423,427 | Payn et al. | July 1, 1947 |

FOREIGN PATENTS

| | | |
|---|---|---|
| 523,732 | France | Aug. 24, 1921 |